US010259045B2

(12) United States Patent
Karlen et al.

(10) Patent No.: US 10,259,045 B2
(45) Date of Patent: Apr. 16, 2019

(54) POWERED REMOVAL FOR ELEMENT FORMED BY POWDER BED FUSION ADDITIVE MANUFACTURING PROCESSES

(71) Applicant: Hamilton Sundstrand Corporation, Charlotte, NC (US)

(72) Inventors: Eric Karlen, Rockford, IL (US); Sergey Mironets, Charlotte, NC (US); Diana Giulietti, Tariffville, CT (US); Kiley James Versluys, Hartford, CT (US); Colette O. Fennessy, Bloomfield, CT (US); William Louis Wentland, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 693 days.

(21) Appl. No.: 14/859,916

(22) Filed: Sep. 21, 2015

(65) Prior Publication Data

US 2017/0080496 A1 Mar. 23, 2017

(51) Int. Cl.
*B22F 3/24* (2006.01)
*B33Y 10/00* (2015.01)
(Continued)

(52) U.S. Cl.
CPC .............. *B22F 3/24* (2013.01); *B22F 3/1055* (2013.01); *B33Y 10/00* (2014.12); *B33Y 40/00* (2014.12);
(Continued)

(58) Field of Classification Search
CPC .... B22F 3/24; B22F 3/1055; B22F 2003/247; B22F 2003/1059; B22F 2202/05; B22F 2202/06; B22F 2999/00
See application file for complete search history.

(56) References Cited

U.S. PATENT DOCUMENTS

| 5,053,090 A | 10/1991 | Beaman |
| 2015/0034123 A1 | 2/2015 | Pressacco |
| 2015/0050179 A1 | 2/2015 | Hawes |

FOREIGN PATENT DOCUMENTS

| GB | 2517490 A | 2/2015 | |
| WO | 2013137283 A1 | 9/2013 | |
| WO | WO-2013137283 A1 * | 9/2013 | ............. C22C 38/00 |

OTHER PUBLICATIONS

"Rapid Heating Approaches." Sintering: From Empirical Observations to Scientific Principles, by Randall M. German, Elsevier/Butterworth-Heinemann, 2014, p. 403. (Year: 2014).*

(Continued)

*Primary Examiner* — Colleen P Dunn
*Assistant Examiner* — Anthony M Liang
(74) *Attorney, Agent, or Firm* — Cantor Colburn LLP

(57) ABSTRACT

A method for forming a part includes: forming a first portion of the part at a first level; forming a second portion of the part at a second level; wherein forming the first and second portions includes exposing the first and second levels to a sintering process and portions of the first and second levels to an electron beam; causing a magnetorheological (MR) fluid to move into a passage inside the first and second portions; exposing the first and second portions to a magnetic field causing motion of particles in the MR fluid to move and break up sintered material in the passage; and removing some or all of the sintered material in the passage.

6 Claims, 5 Drawing Sheets

(51) Int. Cl.
*B33Y 40/00* (2015.01)
*B22F 3/105* (2006.01)
(52) U.S. Cl.
CPC . *B22F 2003/1059* (2013.01); *B22F 2003/247* (2013.01); *B22F 2999/00* (2013.01); *Y02P 10/295* (2015.11)

(56) References Cited

OTHER PUBLICATIONS

Extended European Search Report for International Application No. 16189879.6, dated Feb. 13, 2017, 31 pages.

\* cited by examiner

POWERED REMOVAL FOR ELEMENT FORMED BY POWDER BED FUSION ADDITIVE MANUFACTURING PROCESSES

BACKGROUND OF THE INVENTION

This invention relates forming elements or parts and, more particularly, to a method of removing power from parts formed by powder bed fusion.

Powder bed fusion (PBF) methods use either a laser or electron beam to melt and fuse material powder together. Electron beam melting (EBM) is a particular example of a PBF method and is a type of additive manufacturing (AM) for metal parts. In particular, it is a powder bed fusion technique process where an electron beam is used to melt metal powder layer by layer in a vacuum to form a product. One unique aspect of EBM additive manufacturing is that non-melted particles, i.e. those particles not utilized in the final part, are sintered together. The sintering process binds the non-melted particles together providing additional mechanical strength during the build process. The sintered particle is very difficult to remove from more complex structures, particularly those that contain internal features such passages or blind holes. Another type of PBF utilizes a laser. Powder is not sintered but complex geometries may still exist that include unfused powder.

BRIEF DESCRIPTION OF THE INVENTION

According to one aspect of the invention, a method for forming a part is disclosed. The method includes: forming a first portion of the part at a first level; forming a second portion of the part at a second level; wherein forming the first and second portions includes exposing the first and second levels to a sintering process and portions of the first and second levels to an electron beam; causing a magnetorheological (MR) fluid to move into a passage inside the first and second portions; exposing the first and second portions to a magnetic field causing motion of particles in the MR fluid to move and break up sintered material in the passage; and removing some or all of the sintered material in the passage.

In another aspect, a method for forming a part is disclosed. This method includes: forming a first portion of the part at a first level; forming a second portion of the part at a second level; wherein forming the first and second portions includes exposing the first and second levels to a sintering process and portions of the first and second levels to an electron beam; forming a wire in the passage formed inside the first and second portions by exposing a portion of the passage to the electron beam; causing a magnetorheological (MR) fluid to move into a passage inside the first and second portions; and applying a current to the wire which creates a magnetic field causing motion of particles in the MR fluid to move and break up sintered material in the passage; and removing some or all of the sintered material in the passage.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As briefly described above, it is very difficult to remove the dense, sintered powder after completion of the build. Parts with internal features such as passages within a housing have to be specially processed in order to remove dense powder. Powder removal is a step that, for complex parts, will add cost to an additively built part. Embodiments disclosed herein may provide a more efficient or economical solution to removing the dense power.

The methods disclosed herein may expedite and minimize the amount of time required for powder removal from PBF (including EBM and laser PBF) manufactured parts. In one embodiment, a magnetorheological (MR) fluid or a ferro-fluids is caused to infiltrate sintered or semi-sintered residual powder within, for example, a passage or other portion of an AM component. A vacuum may pull the fluid through the passage in one embodiment or another external force may be used to the push the fluid push the fluid through the powder. An external magnetic field may then be applied to the passageway or component at large. The magnetic field may cause particles (e.g., ferromagnetic or ferrimagnetic particles) in the fluid to become aligned which, in turn, causes an application of a shear stress to the sintered or semi-sintered particles. The applied shear stress and increase in viscosity should be enough to mechanically fracture the particles thereby allowing to fall or flow out of a channel or passageway. In some instance, the process may need to be repeated several times depending upon its ability to infiltrate the sintered or semi-sintered powder material. For example, an alternating magnetic field may be applied to cause repetitive shear stresses.

In one embodiment, a powder removal element (e.g., a wire) is formed in an internal passageway of the part itself while the part is being formed. Application of a current to the wire will cause a magnetic field as described above. The current can be constant or could be varying (i.e. be an A.C. current) to create a time varying (e.g., rotating) magnetic field to increase the movement of the particles. Further, additional cleaning elements may be provided on an end of the powder removal element to mechanically pull the powder out after the current has been applied.

Figure 1:
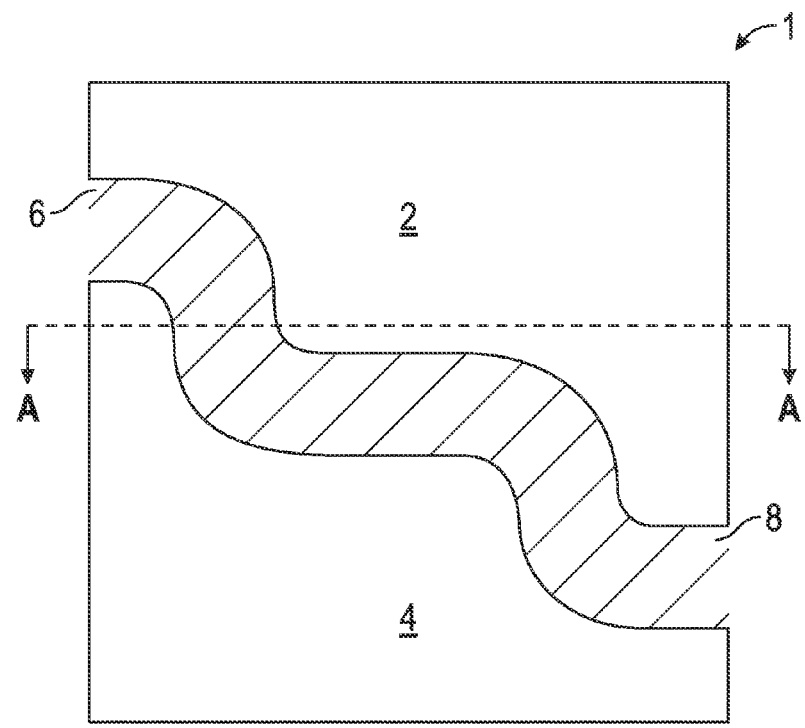
FIG. 1 is a cut-away side view of a part including powder and a removal wire.

FIG. 1 is an example of part 1 that is formed by PBF shown in a cut-away side view. While the following describes an EBM process, the removal methods are applicable to all PBF created pieces where powder needs to be removed from internal passages. The part 1 includes first and second portions 2, 4 separated by an internal passage 6. As the part 1 is formed, metallic power is first layered down and then sintered. The portions of the part 1 that are to become part of the final product are then exposed to an electron beam to convert the sintered powder to a fused dense metal object.

However, the portions of the part that are not exposed to the electron beam are still sintered, just not fully fused by the electron beam.

In the example in FIG. 1, the passage 6 may be filled with sintered or partially sintered material 8. That is, the portions 2, 4 are metal pieces formed by exposing the sintered powder to an electron beam to form the fully fused metal. Portions that are not exposed remain as partially fused/sintered material as illustrated by sintered material 8. Removal of this material to open, for example, passage 6 may be difficult, especially when the passage is not a straight or varies in size.

Figure 2:
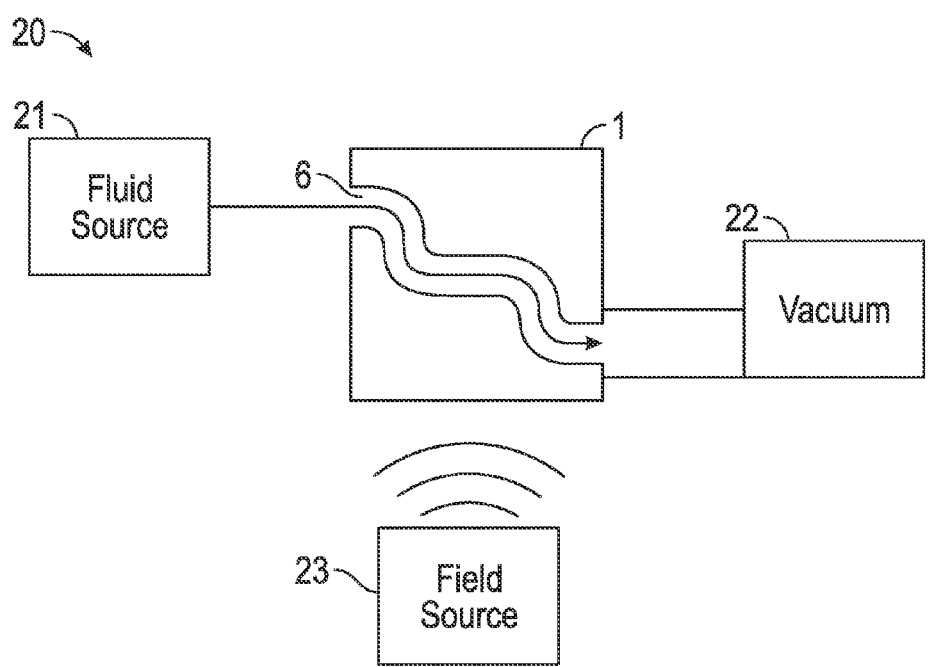
FIG. 2 is a top view of the part of FIG. 1 taken along line A-A.

FIG. 2 shows an example of a system 20 according to one embodiment. The system includes a fluid source 21. The fluid source contains a liquid that contains that includes ferromagnetic or ferrimagnetic particles therein. Thus, the fluid may be an MR fluid in one embodiment. The system 20 also includes a vacuum 22. The vacuum 22 is arranged such that it causes fluid from the fluid source 21 to enter the passageway 6 formed in the part 1. As discussed above, the passageway 6 may include sintered or partially sintered material.

Figure 3A:
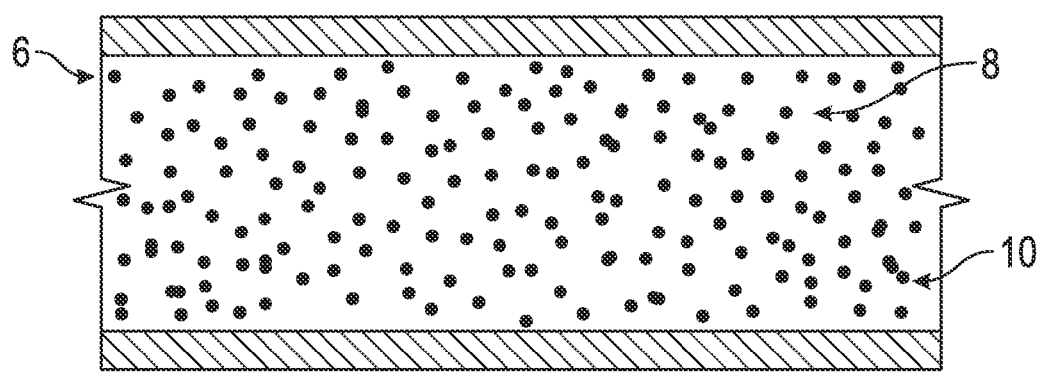
FIGS. 3A and 3B show an example of a passageway containing sintered material after an MR fluid has been drawn into it.
Figure 3B:
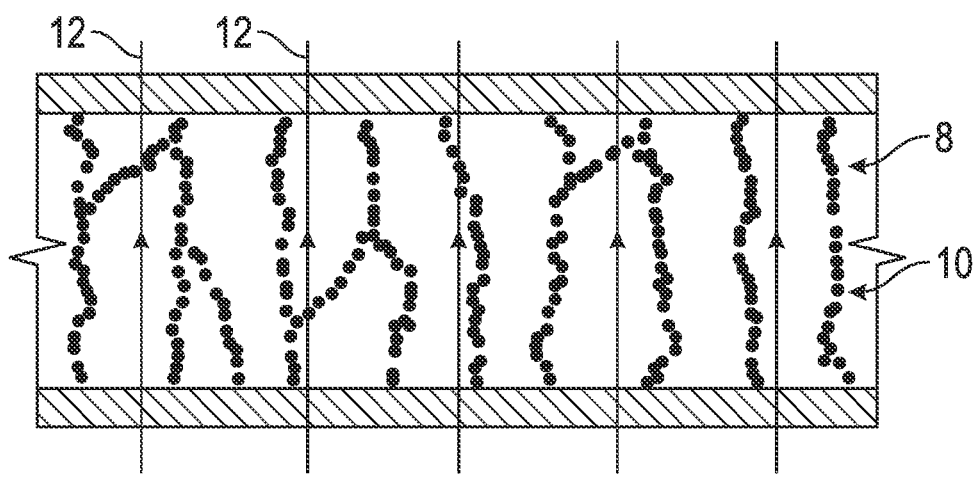

FIGS. 3A and 3B show an example of a passageway 6 containing sintered material 8 after an MR fluid has been drawn into it. In FIGS. 3A and 3B the fluid itself is not shown but the magnetic particles 10 contained therein are.

In FIG. 3A, a magnetic field has not been applied. In FIG. 3B, a magnetic field is/has been applied. As illustrated in FIG. 3B, the particles will line up generally along the magnetic flux lines 12. The movement of the generally random location of the particles 10 in FIG. 3A to the more uniform lines 14 following the flux lines 12 cause shear in the material 8 and, as such, break it up and make it easier to remove. In one embodiment, the vacuum 22 (FIG. 2) may be above to remove the material 8 after the magnetic field has been applied.

In FIG. 2, the source of the magnetic field is general shown as field source 23. Any type of field source may be used. In one embodiment, the field source 23 is a magnetic field generated by permanent magnets (Fe—Nd—B magnets for example). Another field source may be an electromagnet.

In another embodiment, a wire may be formed in the passage way. The same process may be applied above to any of the embodiments below that include a wire. Also, rather than or in addition to the magnetic field being applied by an external source (e.g., field source 23), the magnetic field may be formed by a current passing through the wire. The current may be D.C. or A.C.

Figure 4:
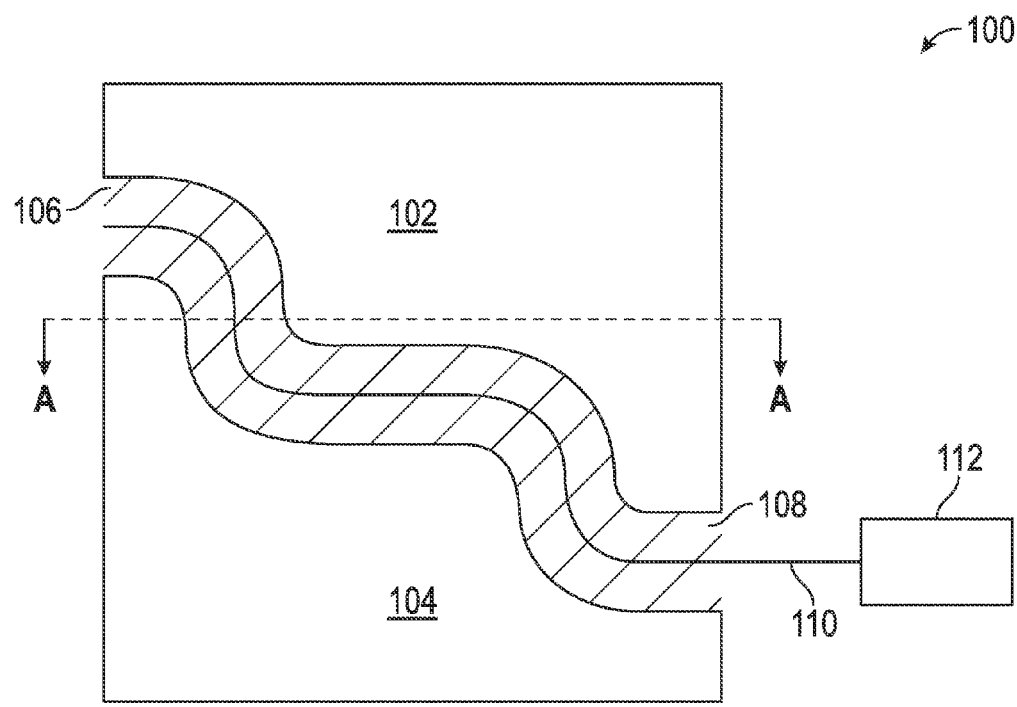
FIG. 4 depicts another embodiment of a wire including a cleaning attachment.

FIG. 4 is an example of part 100 that is formed by PBF shown in a cut-away side view. While the following describes an EBM process, the removal methods are applicable to all PBF created pieces where powder needs to be removed from internal passages. The part 100 includes first and second portions 102, 104 separated by an internal passage 106. As the part 100 is formed, metallic power is first layered down and then sintered. The portions of the part 100 that are to become part of the final product are then exposed to an electron beam to convert the sintered powder to a hard metal object. However, the portions of the part that are not exposed to the electron beam are still sintered, just not fully fused by the electron beam.

In the example in FIG. 4, the passage 106 may be filled with sintered material 108. That is, the portions 102, 104 are metal pieces formed by exposing the sintered powder to an electron beam to form the fully hardened metal. Portions that are not exposed remain as partially fused sintered material as illustrated by sintered material 108. Removal of this material to open, for example, passage 106 may be difficult, especially when the passage is not a straight or varies in size. According to one embodiment, as the part 100 is being formed, a wire 110 is formed through the passage 106. The wire 110 is formed in the same manner as the portions 102, 104. That is, as each level of the part 100 is formed, a small portion of the otherwise sintered only section (e.g., material 108) is exposed to the electron beam to form a continuous wire 110 through it.

Figure 5:
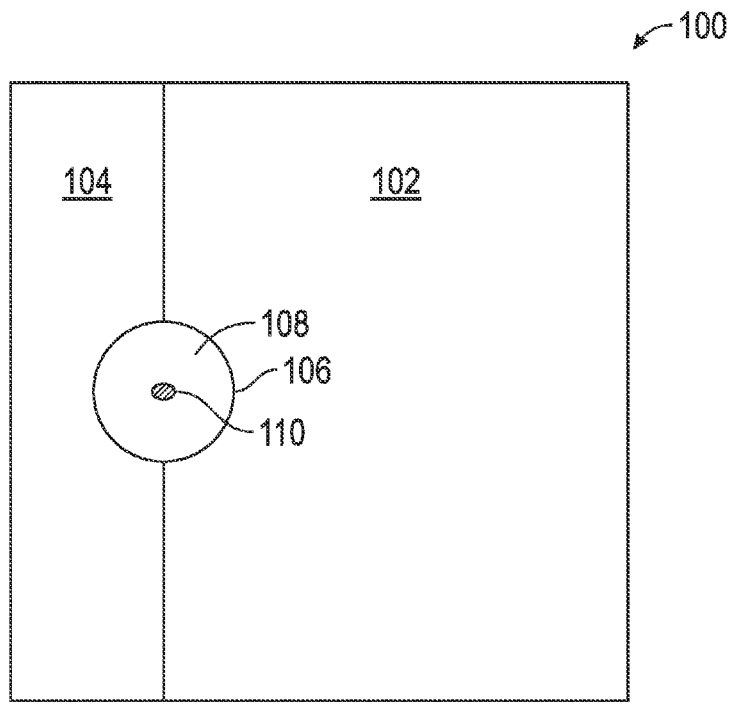
FIG. 5 shows an alternative embodiment that includes multiple wires and cleaning elements in combination.

FIG. 5 shows a top view of the part taken along line A-A from FIG. 1. The portions 102, 104 have been exposed to the electron beam to fully fused powder particles. So too has the wire 110. Thus, portions 102, 104 and wire 110 are in the same state of processing and are fully fused metal. The passage 106 is shown as including sintered material 108 that has not been exposed to an electron beam. This is the material that needs to be removed in order to allow material to pass through passage 106. For example, if the part 100 is a manifold, passage 106 would need material 108 removed in order to allow fluids to pass through it.

With reference to FIG. 4, in one embodiment, the wire 110 may be coupled to a current source 112. The current source 112 may be either A.C, or D.C. in one embodiment. After the fluid has been pulled into the material 108 (as described in relation to FIG. 2 above), the current is applied to the wire 106 and this, as above, causes the particles 10 in the piece to align and shear the material 108 to make it easier to remove.

Figure 6:
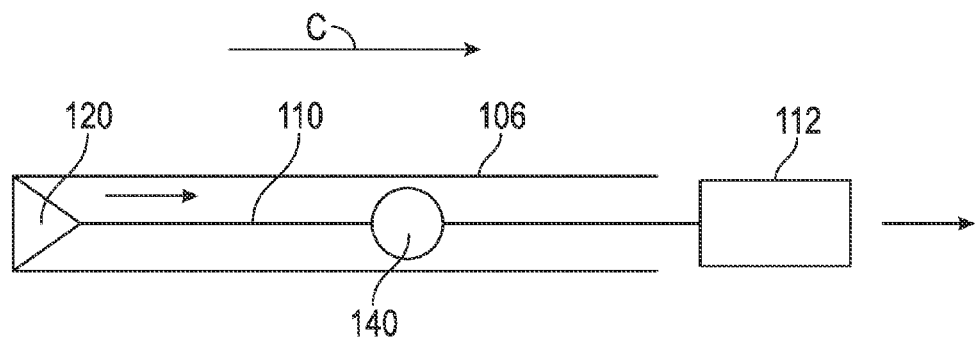
FIGS. 6 AND 7 are other examples of represented powder removal applications

FIG. 6 shows yet another embodiment. In this embodiment, the passage 106 is formed to include wire 110 a cleaning element 120. The cleaning element 120 is formed of the same material as the wire in one embodiment. As the wire 110 is removed (direction C) the cleaning element 120 may aid in powder removal. The particular shape of the cleaning element 120 may be varied from that shown in FIG. 6. Also, more cleaning elements 120 may be provided. In general, the cleaning element 120 has a larger cross-section than the wire 110. In another embodiment, one or more optional additional cleaning elements 140 may be added to the wire 110. One or more of the additional elements 140 may be of a different size or shape than cleaning element 120.

Figure 7:
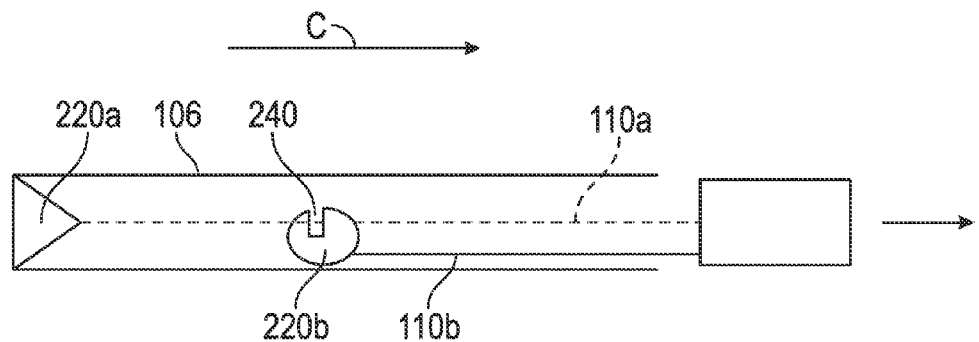

In yet another embodiment, and as shown in FIG. 7, nested cleaning elements 220 may be provided. Each element (e.g., 220a, 220b) may be attached to an individual wire 110a, 110b, respectively. As illustrated, a first cleaning element 220a is attached to a first wire 110a and a second cleaning element 220b is attached to a second cleaning element 220b. In this configuration, the first wire 110a passes through a hole or other passage way (e.g., notch 240) formed in the second cleaning element 220b. This allows the second cleaning element 220b to be removed before the first cleaning element 220a. In this manner, a first amount of powder may be removed and then a second amount (assuming that the second cleaning element 220b is smaller than the first cleaning element 220a). In on embodiment, the wires 110a. 110b may run through different channels to allow them both to work in the illustrated channel 106 and then to work in different channels as they are removed.

Figure 8:
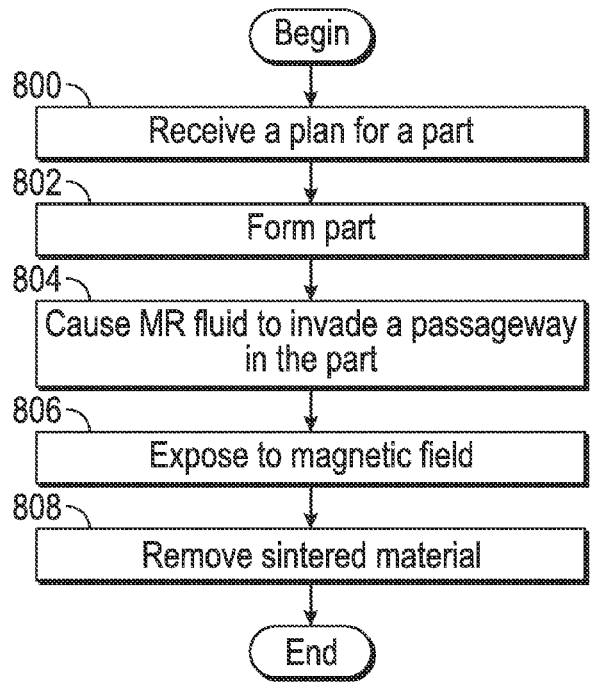
FIGS. 8 and 9 are flow charts for methods of removing powder.

FIG. 8 shows a method according to one embodiment. A block 800 a plan for a part is received. The plan may, for example, be a representation of the part or it may be CAD model of the part. A block 802, the part is formed. Forming the part includes layering down metallic power and then fusing it. The portions of the part that are to become part of the final product are then exposed to an electron beam to convert the sintered powder to a fused metal object. However, the portions of the part that are not exposed to the electron beam are still sintered, just not fully fused by the electron beam. At block 804 an MR fluid is pulled or pushed through an internal passageway of the part such that it invades the internal passageway. At block 806, the part, including the MR fluid, is exposed to a magnetic field. The application of the field causes sintered material to experience a shear stress and makes it easier to remove (block 808) as its structure is broken due to the stress.

Figure 9:
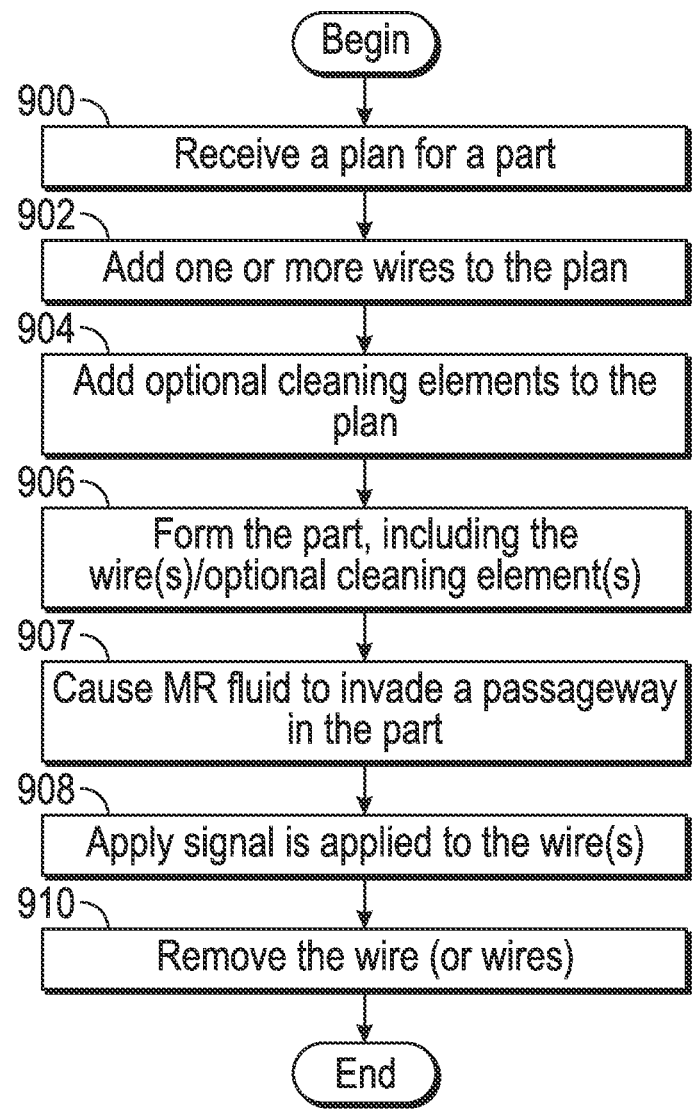

FIG. 9 shows a method according to one embodiment where a wire is used to provide the magnetic field. The method includes several optional steps that may or may not be needed depending on the particular wire/cleaning element combination chosen.

At block 900 a plan for part is received. The plan may, for example, be a representation of the part or it may be CAD model of the part. In some cases, one or more wires are added to the plan at block 902. The additional wires are added such that they will be formed in an interior passage(s) of the part. At block 904 optional cleaning elements are added to the plan. At block 906 the part, including the wire(s)/optional cleaning element(s), is formed. The part and the wires are formed using electron beam manufacturing as described above. At block 907 an MR fluid is pulled or pushed through an internal passageway of the part such that it invades the internal passageway.

At block 908 a signal is applied to the wires. This signal causes sintered powder to break up or otherwise become easier to remove is it causes motion of the MR particles. At block 610 the wire (or wires) is removed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for forming a part, the method comprising:
   forming a first portion of the part at a first level;
   forming a second portion of the part at a second level;
   wherein forming the first and second portions includes exposing the first and second levels to a sintering process and portions of the first and second levels to an electron beam;
   forming a wire in a passage formed inside the first and second portions by exposing sintered metallic powder in the passage to the electron beam;
   causing a magnetorheological (MR) fluid to move into the passage inside the first and second portions; and
   applying a current to the wire which creates a magnetic field causing motion of particles in the MR fluid to move and break up sintered material in the passage; and
   removing some or all of the sintered material in the passage.

2. The method of claim 1, wherein the first and second levels are formed from a sintered metallic powder.

3. The method of claim 1, wherein forming the at least one wire includes forming a section of the wire such that it has a larger cross-section than other portions of the wire.

4. The method of claim 1, further, comprising:
   forming a secondary wire;
   applying a signal to the secondary wire; and
   removing the secondary wire.

5. The method of claim 4, wherein the wire passes at least partially through a secondary cleaning element.

6. The method of claim 1, wherein the current is an alternating current.

\* \* \* \* \*